United States Patent
Park (10) Patent No.: US 8,060,826 B2
(45) Date of Patent: Nov. 15, 2011

(54) METHOD FOR PROCESSING STILL IMAGE AND BROADCAST RECEIVING APPARATUS THEREOF

(75) Inventor: Mi-kyoung Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 702 days.

(21) Appl. No.: 11/856,778

(22) Filed: Sep. 18, 2007

(65) Prior Publication Data

US 2008/0209323 A1 Aug. 28, 2008

(30) Foreign Application Priority Data

Feb. 27, 2007 (KR) .................. 10-2007-0019768

(51) Int. Cl.
*G06F 3/00* (2006.01)
(52) U.S. Cl. ............................................ 715/720
(58) Field of Classification Search .......... 715/721, 715/730, 720, 833
See application file for complete search history.

(56) References Cited

U.S. PATENT DOCUMENTS

| | | | |
|---|---|---|---|
| 6,667,751 B1* | 12/2003 | Wynn et al. .................. 715/833 |
| 7,221,470 B2 | 5/2007 | Takamine et al. |
| 7,633,642 B2* | 12/2009 | Shibamiya et al. .......... 358/1.15 |
| 2003/0107773 A1 | 6/2003 | Takamine et al. |
| 2004/0070689 A1 | 4/2004 | Mochizuki et al. |
| 2004/0189691 A1* | 9/2004 | Jojic et al. ...................... 345/720 |
| 2005/0151881 A1* | 7/2005 | Yamaguchi et al. .......... 348/552 |
| 2006/0072146 A1 | 4/2006 | Ellison Biddle et al. |
| 2007/0030516 A1* | 2/2007 | Tsuji et al. .................... 358/1.15 |
| 2007/0074115 A1* | 3/2007 | Patten et al. ................... 715/716 |
| 2010/0192095 A1* | 7/2010 | Ubillos et al. ................ 715/810 |

FOREIGN PATENT DOCUMENTS

| | | |
|---|---|---|
| CN | 1424848 A | 6/2003 |
| CN | 1708085 A | 12/2005 |
| EP | 0 892 543 A2 | 1/1999 |
| EP | 1 079 595 A2 | 2/2001 |
| EP | 1 320 252 A2 | 6/2003 |
| KR | 10-2004-0065404 A | 7/2004 |

OTHER PUBLICATIONS

Chinese Office Action, dated Dec. 14, 2010, issued in Application No. 200710159937.3.

* cited by examiner

*Primary Examiner* — Thanh Vu
(74) *Attorney, Agent, or Firm* — Sughrue Mion, PLLC (57) ABSTRACT

A method for processing a still image and a broadcast receiving apparatus thereof is provided. The method for processing a still image includes transmitting to an external apparatus a still image selected by a user using a GUI window to select a desired still image from among still images of a stored broadcast. Accordingly, the user can conveniently use the home network service.

28 Claims, 8 Drawing Sheets

METHOD FOR PROCESSING STILL IMAGE AND BROADCAST RECEIVING APPARATUS THEREOF

CROSS-REFERENCE TO RELATED APPLICATIONS

This application claims priority from Korean Patent Application No. 10-2007-0019768, filed on Feb. 27, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to receiving a broadcast and, more particularly, to receiving a broadcast which may be provided to a user and in which communication may be wirelessly performed with peripheral wireless devices.

2. Description of the Related Art

The recent development of wireless communication and networking technologies has led to the appearance of wireless networks, and wireless communication between wireless devices in the wireless network enables users to utilize various and convenient services.

Display apparatuses, such as televisions (TVs), may display large amounts of information and various graphical user interfaces (GUIs) to users through wide screens, and accordingly TVs serve as leaders in home networks. Therefore, users may control and access the entire home network through TVs.

In order to easily use home network services, there is a need for a method for more conveniently using home network services through TVs.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for processing a still image and a broadcast receiving apparatus thereof, in which a still image selected by a user through a graphical user interface (GUI) window for selecting a desired still image from among still images of a stored broadcast is transmitted to an external apparatus so that the user may more easily use a home network service.

According to an aspect of the present invention, there is provided a method for processing a still image, the method comprising simultaneously displaying and storing a received broadcast; providing a graphical user interface (GUI) to select one still image from among still images of the stored broadcast; and transmitting the still image selected by a user using the GUI to an external apparatus which is wirelessly connected.

The storing the received broadcast may comprise storing the received broadcast as a moving image in First-In-First-Out (FIFO) order.

The storing the received broadcast may comprise decoding the received broadcast; and simultaneously displaying and storing a decoded broadcast.

The GUI for selecting a still image may be a GUI which enables a user to select one still image from among still images which were broadcast prior to the most recently stored still image.

The GUI for selecting a still image may be a GUI which enables a user to select one still image from among still images which were broadcast a fixed number of times during a predetermined period of time prior to the most recently stored still image.

The GUI for selecting a still image may comprise a first graphic representation in which broadcast times for still images are mapped in chronological order; and a second graphic representation which visually moves over the first graphic representation by user operation to indicate one of the broadcast times which are mapped on the first graphic representation.

The wirelessly connected external apparatus may comprise a wireless printing apparatus which prints a still image which is wirelessly received. The transmitting may comprise changing the resolution of the still image selected by the user to a specific resolution and transmitting the still image to the wireless printing apparatus.

The specific resolution may be one of the original resolution of the still image selected by the user and the maximum resolution supported by the wireless printing apparatus.

The transmitting may comprise transmitting the still image selected by the user to the external apparatus using a Bluetooth technique.

According to another aspect of the present invention, there is provided a broadcast receiving apparatus comprising a storage unit which stores a received broadcast; a generator which generates a graphical user interface (GUI) to be provided through a display; a communication module which enables the broadcast receiving apparatus to wirelessly communicate with an external apparatus; and a controller which controls the generator to display on the display a GUI for selecting a still image which enables a user to select one image from among still images of the broadcast stored in the storage unit, and transmits the still image selected by the user through the GUI to the external apparatus through the communication module.

The storage unit may store the received broadcast as a moving image in First-In-First-Out (FIFO) order.

The broadcast receiving apparatus may further comprise a broadcast processor which decodes the received broadcast. A broadcast decoded by the broadcast processor may be stored in the storage unit.

The GUI for selecting a still image may be a GUI which enables a user to select one still image from among still images which were broadcast prior to the most recently stored still image.

The GUI for selecting a still image may be a GUI which enables a user to select one still image from among still images which were broadcast a fixed number of times during a predetermined period of time prior to the most recently stored still image.

The GUI for selecting a still image may comprise a first graphic representation in which broadcast times for still images are mapped in chronological order; and a second graphic representation which visually moves over the first graphic representation by user operation to indicate one of the broadcast times which are mapped on the first graphic representation.

The wirelessly connected external apparatus may comprise a wireless printing apparatus which prints a still image which is wirelessly received. The controller may transmit the resolution of the still image selected by the user as a specific resolution to the wireless printing apparatus through the communication module.

The specific resolution may be one of the original resolution of the still image selected by the user and the maximum resolution supported by the wireless printing apparatus.

The communication module may be connected to communicate with the external apparatus using a Bluetooth technique.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 1:
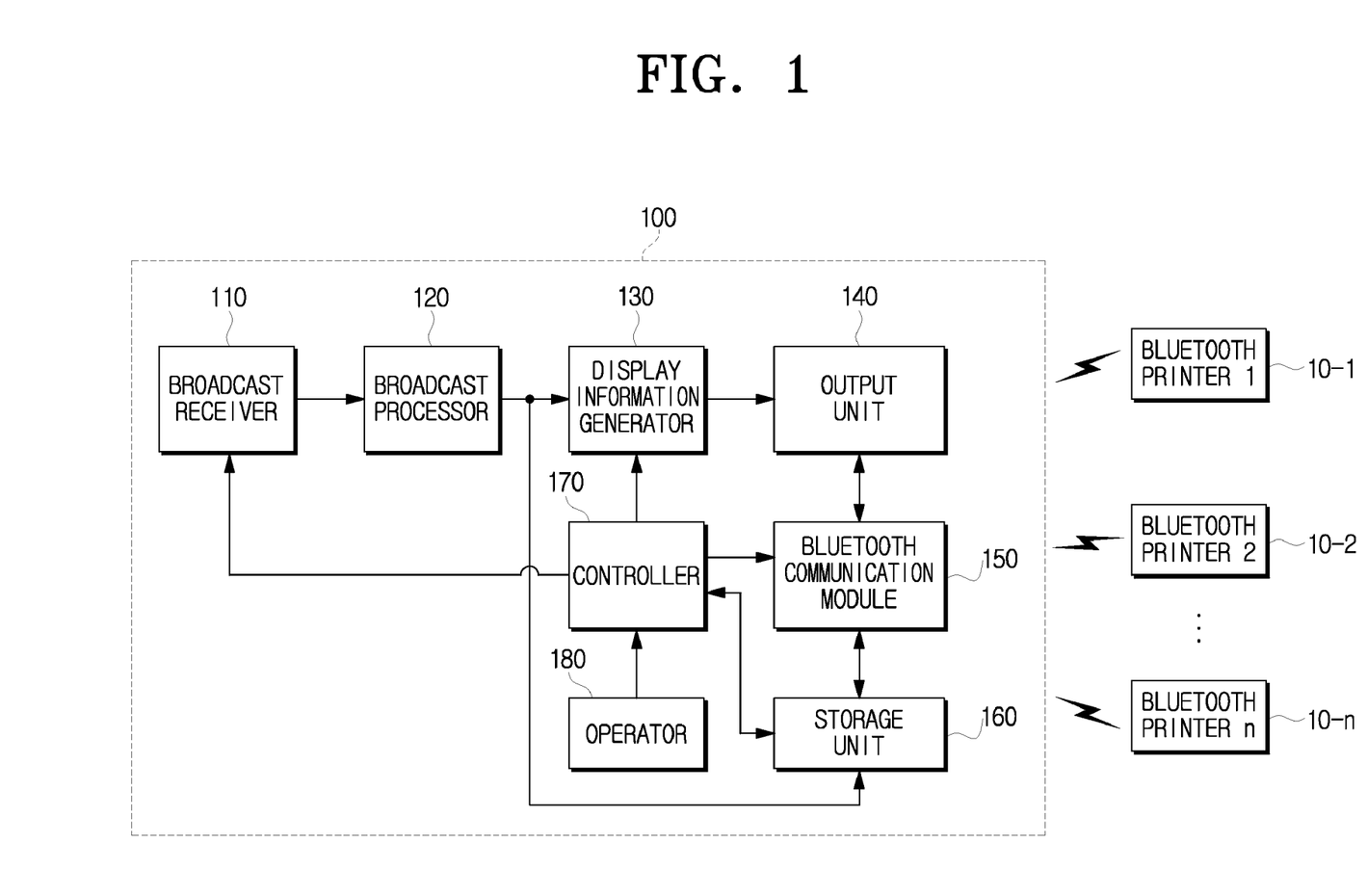
FIG. 1 is a block diagram of a Bluetooth digital television (DTV) according to an exemplary embodiment of the present invention.

FIG. 1 is a block diagram of a Bluetooth digital television (DTV) 100 according to an exemplary embodiment of the present invention. The Bluetooth DTV 100 may provide a broadcast received from a broadcasting station to a user, and also may wirelessly transmit a "paused broadcast image" (hereinafter, simply referred to as "still image") to a Bluetooth printer from among Bluetooth printers 10-1 to 10-n so that the still image may be printed.

As shown in FIG. 1, the Bluetooth DTV 100 which performs the above-described functions comprises a broadcast receiver 110, a broadcast processor 120, a display information generator 130, an output unit 140, a Bluetooth communication module 150, a storage unit 160, a controller 170, and an operator 180.

The broadcast receiver 110 tunes to a broadcast received via a cable or wirelessly, and demodulates the tuned broadcast. The broadcast processor 120 decodes the broadcast output from the broadcast receiver 110.

The display information generator 130 generates display information to be displayed on a display. The generated display information is added to the broadcast decoded by the broadcast processor 120 to be output, and this function is known as an on-screen display (OSD) function. The display information generated by the display information generator 130 may comprise a guide window which contains a guide message, and a graphical user interface (GUI) window for receiving user commands.

The output unit 140 displays the broadcast combined with the display information output from the display information generator 130 on the display, or outputs the broadcast to an external display (for example, an external TV) which is connected through an external output terminal.

The Bluetooth communication module 150 wirelessly communicates with the Bluetooth printers 10-1 to 10-n which are disposed peripherally around the Bluetooth DTV 100, according to a Bluetooth technique. The Bluetooth communication module 150 may transfer data relating to a specific still image to one Bluetooth printer from among the Bluetooth printers 10-1 to 10-n.

The storage unit 160 stores the broadcast decoded by the broadcast processor 120 as a moving image in First-In-First-Out (FIFO) order. Accordingly, in the exemplary embodiment, only the most recent predetermined segment (for example, approximately 3 seconds) of the decoded broadcast is stored in the storage unit 160. The predetermined segment may also be longer or shorter than 3 seconds (for example, approximately 6 seconds or approximately 2 seconds).

Since the broadcast is stored as a moving image in the storage unit 160, several still images constituting the broadcast may be stored in the storage unit 160. The still images stored in the storage unit 160 may be transferred to the display information generator 130 to be displayed together with additional information on the display, or may be transmitted to the Bluetooth printer through the Bluetooth communication module 150 to be printed.

The controller 170 controls the entire operation of the Bluetooth DTV 100 according to the user operation commands input through the operator 180. The operator 180 may be implemented with, for example, a remote controller, and a light receiving element for transmitting the user operation commands received by the remote controller to the controller 170.

In particular, the controller 170 controls the display information generator 130 so that a GUI window for selecting a still image to be printed, a GUI window for receiving user commands relating to printing, or other windows may be provided to a user through the display. Additionally, the controller 170 controls the operation of the Bluetooth DTV 100 according to the user commands input through the GUI window, and detailed description thereof will be given in detail with reference to FIG. 2.

Figure 2:
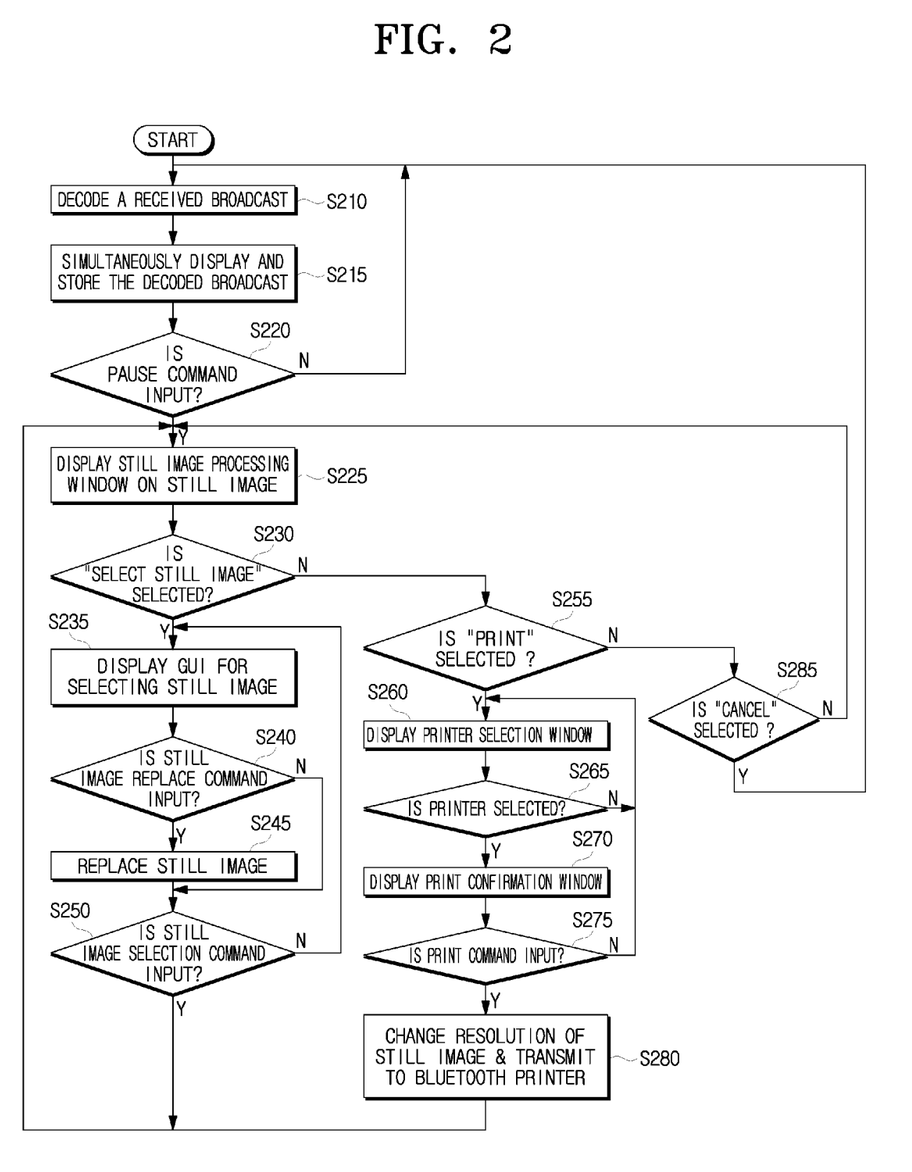
FIG. 2 is a flowchart explaining a process by which the Bluetooth DTV shown in FIG. 1 processes a still image.

FIG. 2 is a flowchart explaining a process by which the Bluetooth DTV shown in FIG. 1 provides a GUI window for receiving user commands relating to a still image and processes the still image according to the user commands input through the provided GUI window.

In FIG. 2, the broadcast processor 120 decodes a broadcast received from the broadcast receiver 110 (S210). The broadcast decoded in operation S210 is displayed by the output unit 140, and simultaneously stored in the storage unit 160 (S215). As described above, the storage unit 160 stores the most recent predetermined segment (for example, approximately 3 seconds) of the decoded broadcast as a moving image in FIFO order.

During operations S210 and S215, if a user inputs a "Pause" command through the operator 180 (S220-Y), the controller 170 may control such that a still image processing window may be displayed on the still image obtained by pausing the broadcast image displayed on the display (S225).

The "Pause" command in operation S220 may be input by pressing a "temporary stop" button included in the operator 180.

In order to perform operation S225, the controller 170 controls the broadcast receiver 110 so that the broadcast may not be received after the input of the Pause command, controls the latest still image stored in the storage unit 160 when inputting the Pause command to be transferred to the display information generator 130, and controls the display information generator 130 to add the still image processing window to the transferred still image so that the still image and the still image processing window may be displayed on the display.

Figure 3A:
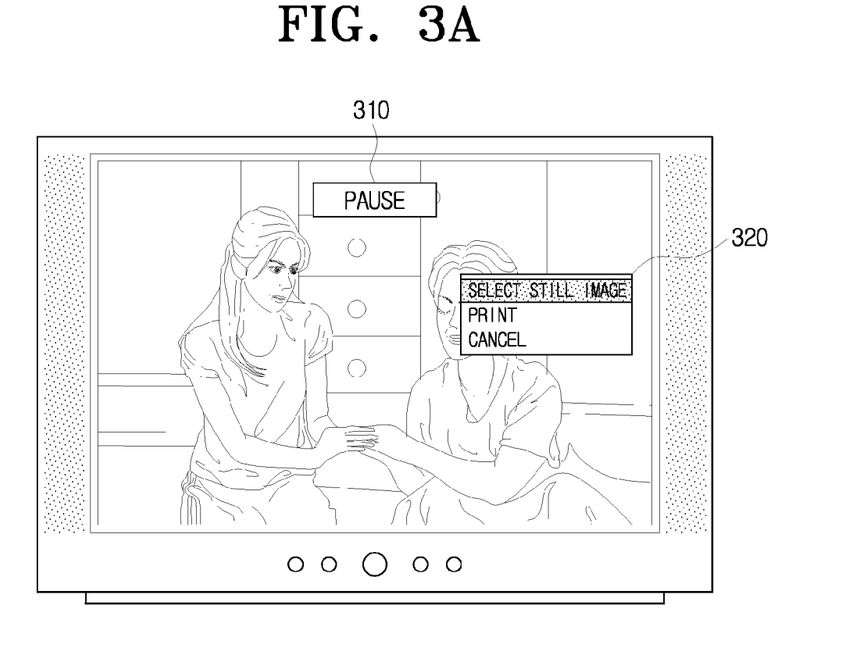
FIGS. 3A to 3E are views explaining in detail the process by which the Bluetooth DTV processes a still image as shown in FIG. 2.

The "still image processing window" refers to a GUI window for receiving user commands relating to the next processes of the still image displayed on the display. FIG. 3A shows a display on which the still image and the still image processing window are displayed.

As shown in FIG. 3A, a guide window 310 which contains a message to inform the user that the broadcast image has been paused is displayed and a still image processing window 320 comprising several details is also displayed on the display.

Specifically, the still image processing window 320 comprises a "Select still image" item, a "Print" item, and a "Cancel" item, detailed descriptions of which are given below.

The "Select still image" item is selected to call a GUI window used to replace a still image currently displayed on the display with another still image, the "print" item is selected to command to print a still image currently displayed on the display through the Bluetooth printer, and the "cancel" item is used to command to release the Pause command and to display a received broadcast on the display.

If the "Select still image" item is selected from the still image processing window 320 (S230-Y), the controller 170 may control the display information generator 130 to display a GUI window 340 for selecting a still image on the display (S235).

Figure 3B:
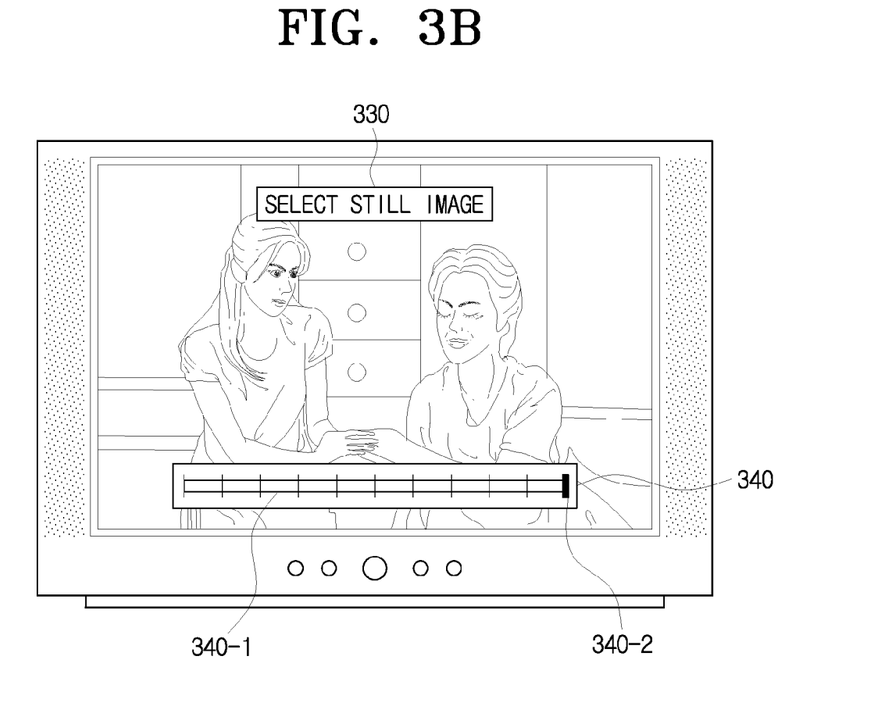

The GUI window 340 for selecting a still image is a GUI window which enables the user to select one still image from among the still images stored in the storage unit 160. FIG. 3B shows a display on which the GUI window 340 for selecting a still image together with a guide window 330 which contains a message to inform the user that the "Select still image" item is selected.

The user may replace the still image currently displayed on the display with another still image through the GUI window 340 for selecting a still image. Specifically, the user may select one still image from among still images which were broadcast prior to the still image currently displayed on the display (that is, the most recent still image stored in the storage unit 160), through the GUI window 340 for selecting a still image.

The GUI window 340 for selecting a still image comprises a progress bar 340-1 and a slide bar 340-2. The progress bar 340-1 is a graphic representation of the broadcast stored in the storage unit 160 in a form of a bar. Still images corresponding to specific broadcast times among the still images stored in the storage unit 160 are mapped in chronological order on marks on a scale displayed on the progress bar 340-1.

The marks may have constant intervals, and the still images mapped on the marks may have constant intervals between broadcast times. Accordingly, still images which were broadcast a fixed number of times during a predetermined period of time prior to the most recent still image stored in the storage unit 160 are mapped on the marks.

More specifically, if a broadcast for approximately 3 seconds is stored in the storage unit 160 and the number of marks displayed on the progress bar 340-1 is 11, (1) a still image which has been broadcast 3 seconds prior to the last still image (hereinafter, simply referred to as a "still image 3 seconds before"), (2) a still image 2.7 seconds before, (3) a still image 2.4 seconds before, . . . , (10) a still image 0.3 seconds before, and (11) the last still image may be individually mapped on 11 marks appearing on the progress bar 340-1.

The slide bar 340-2 visually slides left or right along the progress bar 340-1 by user operations input through the operator 180. The slide bar 340-2 is a graphic representation used to indicate one mark among the marks displayed on the progress bar 340-1.

If a "still image replace" command is input through the GUI window for selecting a still image provided in operation S235 (S240-Y), the controller 170 may control such that the still image displayed on the display may be replaced with another still image (S245).

In operation S240, the user may input the "still image replace" command by moving the slide bar 340-2 displayed on the progress bar 340-1 to an earlier position (using marks on the left side) or a later position (using marks on the right side) using a "left direction button" and a "right direction button" which are included in the operator 180.

In order to perform operation S245, the controller 170 may control a still image which is mapped on a mark indicated by the slide bar 340-2 after being moved by the "still image replace" command to be transferred from the storage unit 160 to the display information generator 130.

Figure 3C:
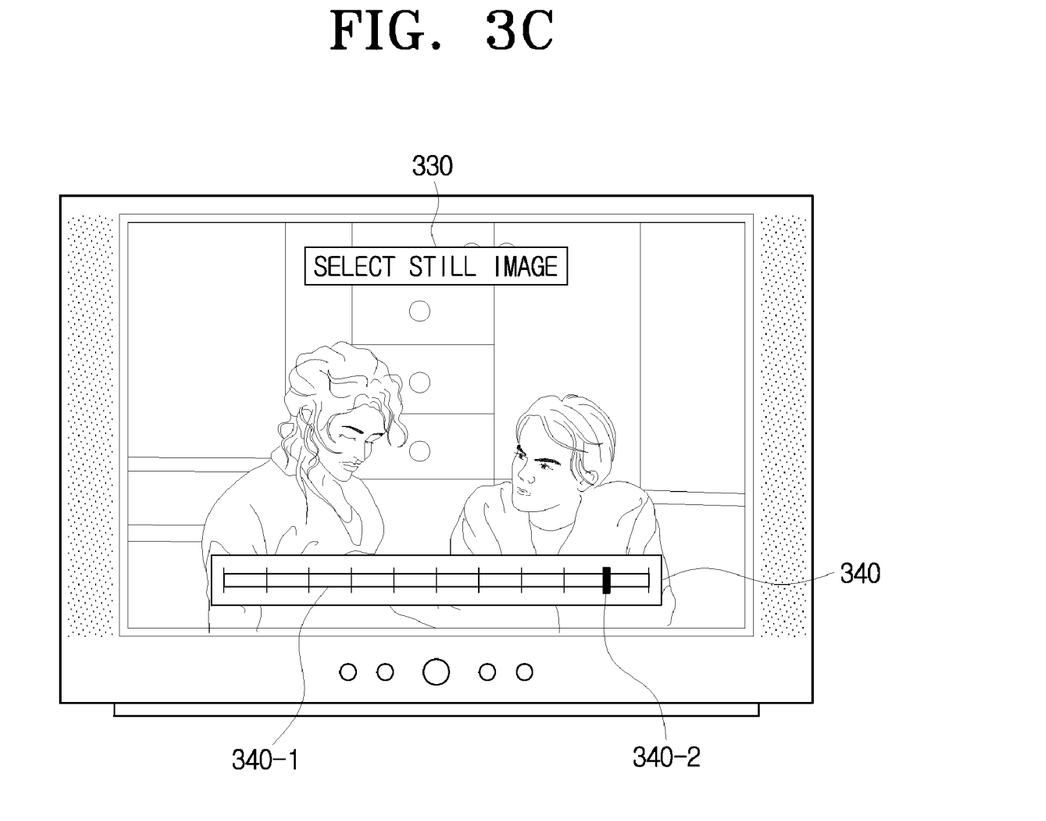

FIG. 3C shows a display on which the still image is replaced with another image by moving the slide bar 340-2 displayed on the progress bar 340-1 to an earlier mark using the left direction button of the operator 180 in operation S240. As shown in FIG. 3C, the slide bar 340-2 slides to the left by one mark, and a still image mapped on the mark indicated by the slide bar 340-2 is displayed on the display.

If a "still image selection" command is input (S250-Y), operation S225 may be performed and the still image process window 320 shown in FIG. 3A may be again displayed on the display. The "still image selection" command of operation S250 may be input by pressing a "selection" button included in the operator 180.

If the "Select still image" item is selected from the still image process window 320 (S230-Y), processing may be re-performed from operation S235.

If the "Print" item is selected from the still image process window 320 (S255-Y), the controller 170 may control the display information generator 130 to display a "printer selection window" on the display (S260).

Figure 3D:
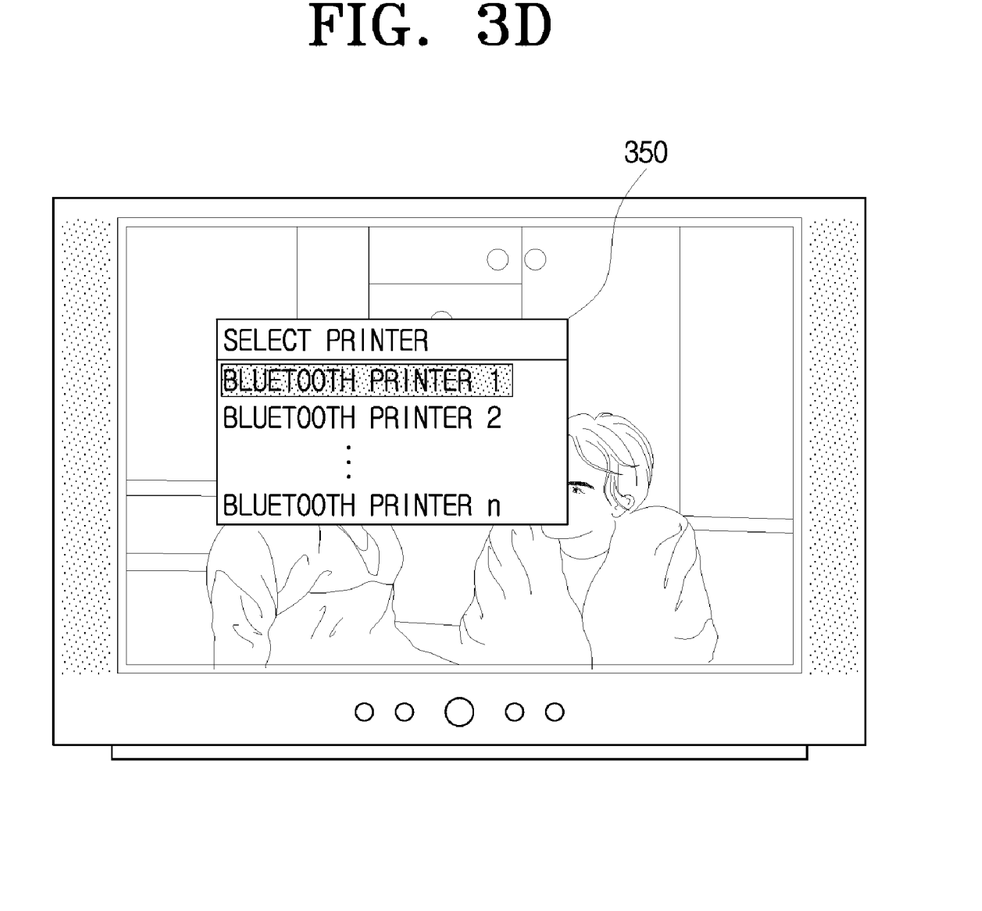

The "printer selection window" is a GUI window which enables the user to select a desired printer from among the Bluetooth printers 10-1 to 10-n that are currently connected wirelessly through the Bluetooth communication module 150. FIG. 3D shows a display on which a printer selection window 350 is displayed. As shown in FIG. 3D, names of the Bluetooth printers 10-1 to 10-n that are wirelessly connected are arranged on the printer selection window 350, and a currently selected printer from among the arranged Bluetooth printers 10-1 to 10-n is indicated with a cursor or by highlighting.

If a Bluetooth printer is selected through the printer selection window 350 provided in operation S260 (S265-Y), the controller 170 may control the display information generator 130 to display a "printer confirmation window" on the display (S270).

Figure 3E:
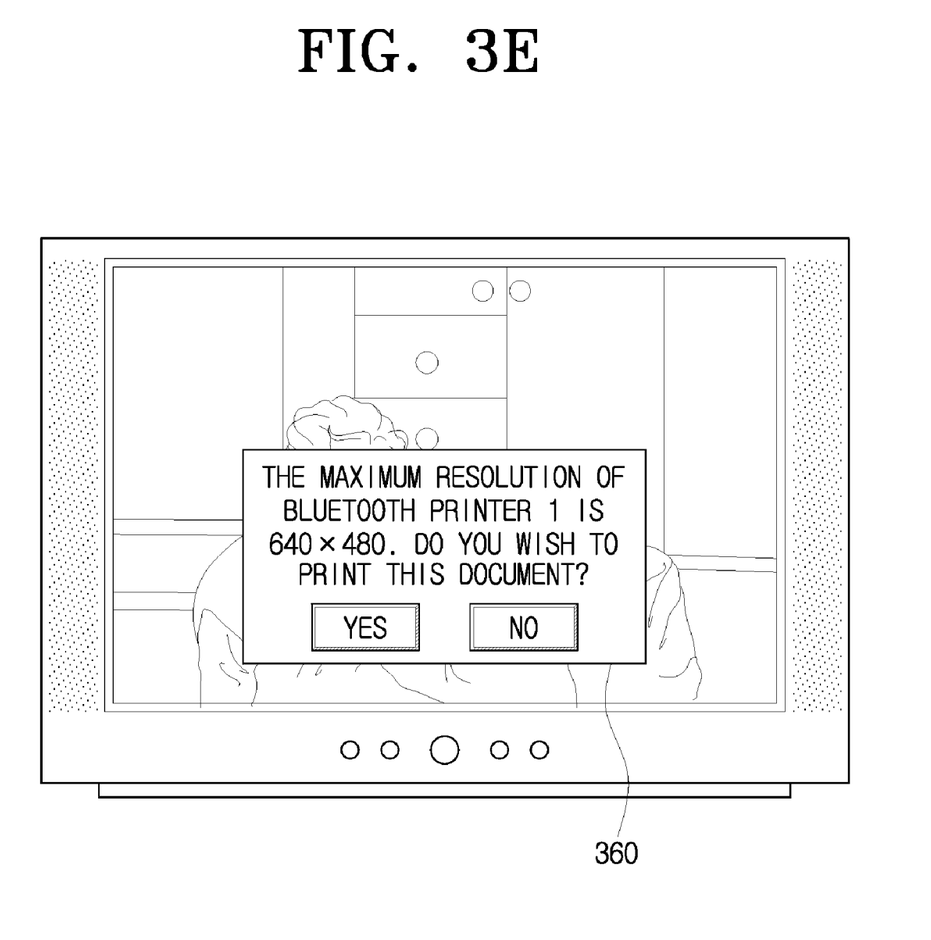

The "printer confirmation window" is a GUI window which enables the user to check finally whether a command to print the still image currently being displayed on the display is transmitted to the selected Bluetooth printer. FIG. 3E shows a display on which a printer confirmation window 360 is displayed.

As shown in FIG. 3E, items "YES" and "NO", which allow the user to input whether to print the image, are displayed on the printer confirmation window 360. Additionally, a message notifying the maximum resolution supported by a selected first Bluetooth printer 10-1 appears on the printer confirmation window 360.

If a print command is input through the printer confirmation window 360 provided in operation S270 (S275-Y), the controller 170 may change the resolution of the still image displayed on the display, and may transmit the still image having the changed resolution to the Bluetooth printer (S280). Accordingly, the still image may be printed using the Bluetooth printer.

In this situation, since the user selects "YES" through the printer confirmation window 360 provided in operation S270, the print command is input in operation S275.

In order to perform operation S280, the controller 170 reads from the storage unit 160 the still image (that is, a still image selected by the user) currently being displayed on the display, and changes the resolution of the read still image to the maximum resolution supported by the Bluetooth printer selected in operation S265. Additionally, the controller 170 transmits the still image having the changed resolution to the Bluetooth printer selected in operation S265 through the Bluetooth communication module 150.

When performing operation S280, if the maximum resolution supported by the Bluetooth printer selected in operation S265 is higher than the original resolution of the still image currently being displayed on the display, the still image currently being displayed on the display may be transmitted to the Bluetooth printer without changing the resolution of the still image. Accordingly, it is possible to prevent the image quality degradation which may arise when increasing the resolution of the still image.

After operation S280, processing may be re-performed from operation S225, and thus the still image processing window 320 shown in FIG. 3A may be displayed on the display again. If the "Cancel" item is selected from the still image processing window 320 (S285-Y), processing may be re-performed from operation S210.

The process for printing the still image, which is selected by the user using the GUI window to select the still image to be printed from among still images of the stored broadcast, using the Bluetooth printer was described in detail with reference to the exemplary embodiment of the present invention. However, the process for printing is not limited to using a Bluetooth printer and other printing processes may be used.

In the exemplary embodiment of the present invention, the decoded broadcast (that is, decoded still images) is stored in the storage unit 160, in order to quickly replace the still image to be displayed on the display with another image. However, the present invention is not limited to this case, so decoding may be performed after storing a broadcast without decoding and displaying still images of the stored broadcast on a display.

Additionally, in the exemplary embodiment of the present invention, the storage space of the storage unit 160 and intervals between the marks displayed on the progress bar 340-1 are merely exemplary for convenience of description, and accordingly various numerical values may be applied.

Furthermore, the technical aspect of the present invention may be applied, even if the marks displayed on the progress bar 340-1 represent irregular intervals. The number of marks displayed on the progress bar 340-1 may be adjusted by the user setting.

Although the slide bar 340-2 is slid along the progress bar 340-1 by user operation in the exemplary embodiment of the present invention, the slide bar 340-2 may automatically slide to the left along the progress bar 340-1 without direct operation by the user. In this situation, if the slide bar 340-2 is placed on the mark on which a desired still image is mapped, the user may input a "Pause" command to select the still image. Additionally, if the slide bar 340-2 slides to the leftmost side of the progress bar 340-1, the slide bar 340-2 may then move to the rightmost side of the progress bar 340-1 and may slide to the left again.

In order to provide the printer selection window to the user through the display, the controller 170 has already secured information relating to the Bluetooth printers 10-1 to 10-*n* which are connected through the Bluetooth communication module 150, or may secure the information relating to the Bluetooth printers 10-1 to 10-*n* which are connected through the Bluetooth communication module 150 after the "Print" item is selected.

In addition, the names of the Bluetooth printers 10-1 to 10-*n* which are wirelessly connected are arranged on the printer selection window 350 shown in FIG. 3D, but other information, for example, information relating to the maximum resolution supported by the Bluetooth printers 10-1 to 10-*n* may be arranged together with the names.

Moreover, the controller 170 may change the resolution of the still image in the exemplary embodiment of the present invention, and may also control the operation of the broadcast processor 120.

The situation in which the still image of the received broadcast is selected and printed was described in the exemplary embodiment of the present invention, but the technical aspect of the present invention may also be applied to a situation in which a still image of an image stored in a recording medium is selected and printed.

According to the exemplary embodiment of the present invention, the DTV may wirelessly communicate with the printers by a Bluetooth communication technique, but wireless communication may be performed using wireless communication techniques other than the Bluetooth communication technique. Wireless communication techniques may include a wireless personal area network (WPAN) communication technique, a wireless local area network (WLAN) communication technique or other wireless communication techniques.

A DTV is used as a broadcast receiving apparatus to implement the method for processing the still image according to the exemplary embodiment of the present invention, but the technical aspect of the present invention may also be applied to other broadcast receiving apparatuses (for example, a set-top box) in addition to the DTV. Additionally, an image device other than a broadcast receiving apparatus may also be employed in the exemplary embodiment of the present invention.

Figure 4:
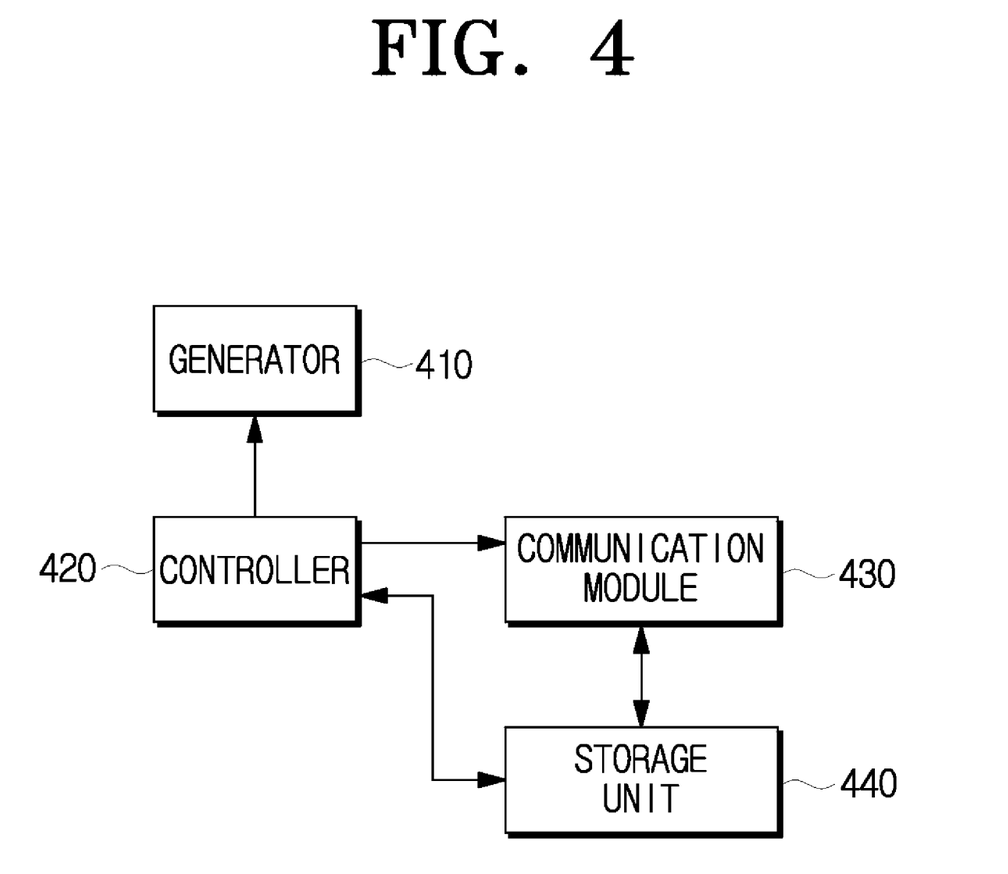
FIG. 4 is a block diagram of a broadcast receiving apparatus according to another exemplary embodiment of the present invention.

Hereinafter, another exemplary embodiment of the present invention is described in detail with reference to FIGS. 4 and 5. Referring to FIG. 4, a broadcast receiving apparatus according to another exemplary embodiment of the present invention comprises a generator 410, a controller 420, a communication module 430, and a storage unit 440.

The generator 410 generates a GUI to be provided through a display, and the communication module 430 enables the broadcast receiving apparatus to wirelessly communicate with an external apparatus. The storage unit 440 stores a received broadcast.

The controller 420 controls the generator 410 so that a GUI for selecting a still image which enables a user to select one still image from among the still images of the broadcast stored in the storage unit 440 may be displayed on the display. The controller 420 also transmits the still image selected by the user through the GUI to the external apparatus through the communication module 430.

Figure 5:
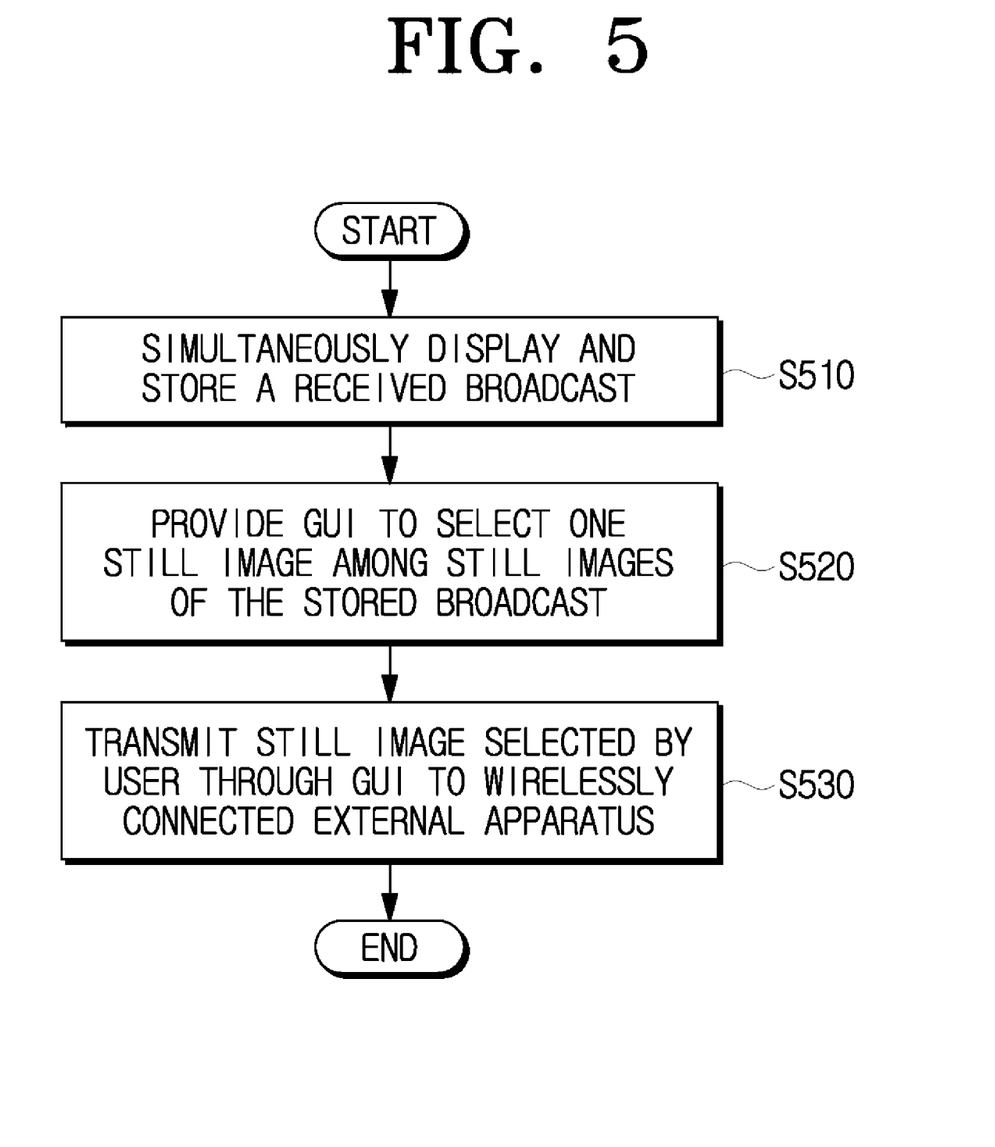
FIG. 5 is a flowchart explaining a process for processing a still image, according to another exemplary embodiment of the present invention.

According to a process for processing a still image as shown in FIG. 5, the broadcast receiving apparatus simultaneously displays and stores the received broadcast (S510). The broadcast receiving apparatus then provides the GUI for selecting a still image which enables a user to select one still image from among the still images of the stored broadcast (S520). Next, the broadcast receiving apparatus transmits the still image selected by the user through the GUI to the external apparatus which is wirelessly connected to the broadcast receiving apparatus (S530).

Accordingly, the still image selected by the user using the GUI window to select a still image to be printed from among still images of the stored broadcast may be transmitted to the external apparatus.

As described above, according to the exemplary embodiment of the present invention, it is possible to transmit to the external apparatus the still image selected by the user using the GUI window to select a desired still image from among still images of the stored broadcast. The GUI window also enables the user to select still images which have already been broadcast and have disappeared from the display. Additionally, a service to print a still image which has already been broadcast and is selected using the external apparatus may be provided to the user, and thus the user can conveniently use the home network service.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for processing a still image, the method comprising:
   receiving video broadcast data including a plurality of still images;
   displaying the received video broadcast data;
   storing the received video broadcast data in a storage unit;
   displaying a first still image from among the plurality of still images;
   receiving a user input for selecting a second still image from among the plurality of still images included in the stored video broadcast data;
   displaying a graphical user interface (GUI) in response to receiving the user input for selecting the second still image, wherein the GUI is displayed on at least a portion of the displayed first still image and is operable to enable a user to select the second still image from among the plurality of still images of the stored video broadcast data;
   receiving a selection of the second still image through the GUI;
   displaying the selected second still image; and
   transmitting the selected second still image to an external apparatus which is wirelessly connected,
   wherein the stored video broadcast data includes storing a segment of predetermined duration of the received video broadcast data, and wherein a time interval between each of the plurality of still images is constant throughout the stored segment.

2. The method as claimed in claim 1, wherein the storing the received video broadcast data comprises storing the received video broadcast data as a moving image in First-In-First-Out (FIFO) order.

3. The method as claimed in claim 1, wherein the received video broadcast data comprises:
   decoding the received video broadcast data; and
   storing the decoded received video broadcast data.

4. The method as claimed in claim 1, wherein the plurality of still images comprises still images which were broadcast prior to a most recently stored still image.

5. The apparatus as claimed in claim 4, wherein the plurality of still images further comprises the most recently stored still image.

6. The method as claimed in claim 1, wherein the plurality of still images comprises still images which were broadcast a fixed number of times during a predetermined period of time prior to a most recently stored still image.

7. The method as claimed in claim 4, wherein the GUI comprises:
   a first graphic representation in which broadcast times for the plurality of still images are mapped in chronological order; and
   a second graphic representation which visually moves over the first graphic representation by user operation to indicate one of the broadcast times which are mapped on the first graphic representation.

8. The method as claimed in claim 1, wherein the wirelessly connected external apparatus comprises a wireless printing apparatus which prints the second still image which has been transmitted to the external apparatus, and
   the transmitting comprises changing the resolution of the second still image selected by the user to a specific resolution and transmitting the second still image to the wireless printing apparatus.

9. The method as claimed in claim 8, wherein the specific resolution is one of the original resolution of the second still image selected by the user and the maximum resolution supported by the wireless printing apparatus.

10. The method as claimed in claim 1, wherein the transmitting comprises transmitting the second still image selected by the user to the external apparatus using a Bluetooth technique.

11. The method as claimed in claim 1, wherein each of the plurality of still images of the received video broadcast data stored in the storage unit are mapped to one of a plurality of marks provided in a progress bar displayed as part of the GUI, and the second still image is selected from among the plurality of still images by moving an indicator along the progress bar to a desired mark from among the plurality of marks.

12. The method as claimed in claim 1, further comprising receiving a pause command to pause the displaying of the received video broadcast data, wherein the displaying of the first still image from among the plurality of still images is performed in response to receiving the pause command.

13. The method as claimed in claim 1, further comprising displaying a still image processing window on the displayed first still image, wherein the user input for selecting the second still image is received through the displayed still image processing window.

14. The method as claimed in claim 1, wherein the plurality of still images selected from which the second still image is selected are successive still images which are adjacent to each other in the received video broadcast data, and are decoded and stored as a moving image, and wherein the plurality of still images from which the second still image is selected represent a most recent segment of predetermined duration of the received video broadcast data.

15. A broadcast receiving apparatus comprising:
a storage unit which stores received video broadcast data including a plurality of still images;
a display operable to display the received video broadcast data including the plurality of still images;
a generator which generates a graphical user interface (GUI), wherein the GUI is operable to enable a user to select a still image from among the plurality of still images of the stored video broadcast data;
a communication module which enables the broadcast receiving apparatus to wirelessly communicate with an external apparatus; and
a controller which:
controls the display to display a first still image from among the plurality of still images;
controls the generator to display the GUI on the display if a user input for selecting a second still image from among the plurality of still images is received, wherein the GUI is displayed on at least a portion of the displayed first still image;
displays the second still image selected by the user through the GUI; and
transmits the second still image selected by the user through the GUI to the external apparatus through the communication module,
wherein the stored video broadcast data includes storing a segment of predetermined duration of the received video broadcast data, and wherein a time interval between each of the plurality of still images is constant throughout the stored segment.

16. The apparatus as claimed in claim 15, wherein the storage unit stores the received video broadcast data as a moving image in First-In-First-Out (FIFO) order.

17. The apparatus as claimed in claim 15, further comprising a broadcast processor which decodes the received video broadcast data, wherein the received video broadcast data decoded by the broadcast processor is stored in the storage unit.

18. The apparatus as claimed in claim 15, wherein the plurality of still images comprises a plurality of images which were broadcast prior to a most recently stored still image.

19. The apparatus as claimed in claim 18, wherein the GUI comprises:
a first graphic representation in which broadcast times for the plurality of still images are mapped in chronological order; and
a second graphic representation which visually moves over the first graphic representation by user operation to indicate one of the broadcast times which are mapped on the first graphic representation.

20. The apparatus as claimed in claim 18, wherein the plurality of still images further comprises a most recently stored still image.

21. The apparatus as claimed in claim 15, wherein the plurality of still images comprises still images which were broadcast a fixed number of times during a predetermined period of time prior to a most recently stored still image.

22. The apparatus as claimed in claim 15, wherein the wirelessly connected external apparatus comprises a wireless printing apparatus which prints a still image which is wirelessly received, and
the controller transmits the resolution of the still image selected by the user as a specific resolution to the wireless printing apparatus through the communication module.

23. The apparatus as claimed in claim 22, wherein the specific resolution is one of the original resolution of the still image selected by the user and the maximum resolution supported by the wireless printing apparatus.

24. The apparatus as claimed in claim 15, wherein the communication module is connected to communicate with the external apparatus using a Bluetooth technique.

25. The apparatus as claimed in claim 15, wherein each of the plurality of still images of the received video broadcast data stored in the storage unit are mapped to one of a plurality of marks provided in a progress bar displayed as part of the GUI, and the second still image is selected from among the plurality of still images by moving an indicator along the progress bar to a desired mark from among the plurality of marks.

26. The apparatus as claimed in claim 15, further comprising an operator unit operable to receive a pause command, wherein the controller controls the display to display the first still image in response to receiving the pause command by the operator unit.

27. The apparatus as claimed in claim 15, wherein the controller further controls the display to display a still image processing window on the displayed first still image, wherein the user input for selecting the second still image is received through the displayed still image processing window.

28. The apparatus as claimed in claim 15, wherein the plurality of still images selected from which the second still image is selected are successive still images which are adjacent to each other in the received video broadcast data, and are decoded and stored as a moving image, and
wherein the plurality of still images from which the second still image is selected represent a most recent segment of predetermined duration of the received video broadcast data.

* * * * *